Sept. 8, 1942.    G. N. SLEZSKINSKY    2,295,241
HOUSING
Filed April 11, 1940    2 Sheets-Sheet 1

INVENTOR
G. N. SLEZSKINSKY
BY E.R. Nowlan
ATTORNEY

Sept. 8, 1942.　　　G. N. SLEZSKINSKY　　　2,295,241
HOUSING
Filed April 11, 1940　　　2 Sheets-Sheet 2
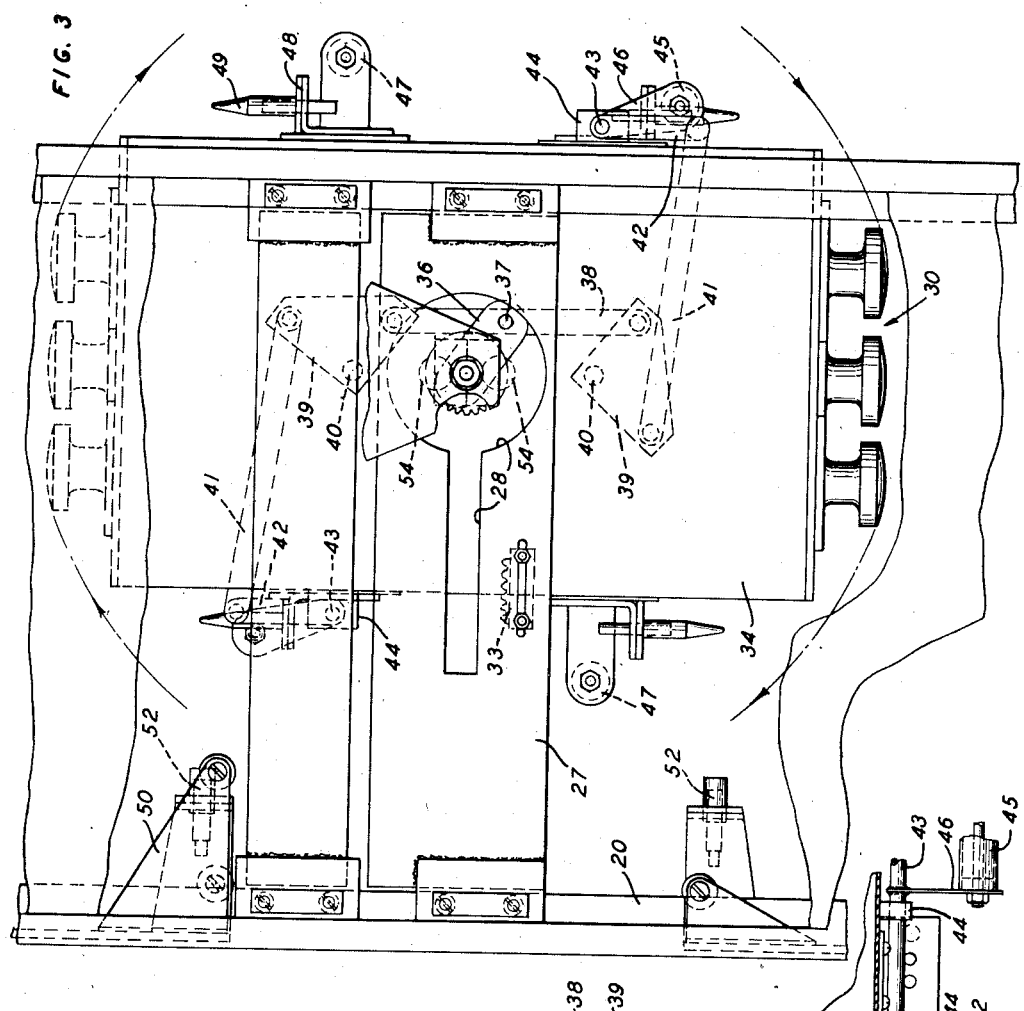
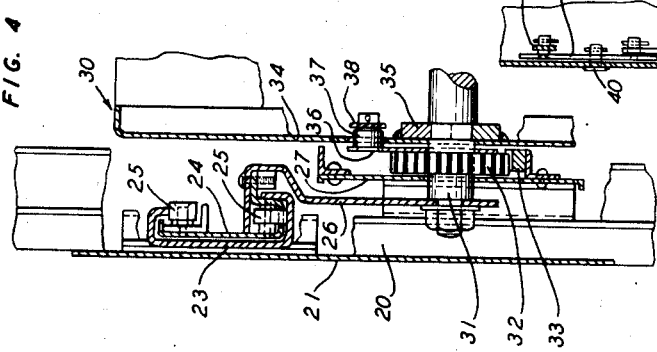
INVENTOR
G. N. SLEZSKINSKY
BY
E. R. Nowlan
ATTORNEY Patented Sept. 8, 1942

2,295,241

UNITED STATES PATENT OFFICE 2,295,241

HOUSING

Gregory N. Slezskinsky, Dunellen, N. J., assignor to Western Electric Company, Incorporated, New York, N. Y., a corporation of New York Application April 11, 1940, Serial No. 329,082

8 Claims. (Cl. 175—307)

This invention relates to a housing, and more particularly to a housing for electrical apparatus which is re-arrangeable to have more than one mode of operation.

In the large scale manufacture of relatively complex assemblages of electrical devices into unitary apparatus, such, for example, as radio transmitters, radio receivers, aviation altimeters, and various assemblies used in telephony and the like, it is found to be advantageous to construct relatively complex testing devices with which to test continuity of circuits, measure electrical values and relations, and perform similar testing operations on the apparatus being manufactured. It is found, in connection with such testing apparatus, that, in some instances, one apparatus may be made to serve more than one purpose, e. g. be used to test two or more different products, by a relatively simple re-connection or re-arrangement of electrical connection of one or more sub-units of its structure. For convenience and safety, such test sets are ordinarily assembled and mounted within some kind of housing, in which electrically closely related devices (coils, condensers, vacuum tubes, relays, switches and the like) may be assembled, connected and mounted in a correspondingly close spatial relation, in sub-units, which are mounted and connected in the housing to form the entire apparatus. One or more of these sub-units may then be so designed and constructed that, when it is interconnected into the rest of the apparatus in one fashion, the entire apparatus becomes operative for use in testing one class or type of product or becomes operative to perform one specific type or group of tests, whereas if that particular sub-unit be interconnected in another fashion, the entire apparatus will be operative for testing another type or class of product or for performing another type or group of tests.

An object of the present invention is to provide a housing for electrical apparatus such as described, having mechanical means and electrical elements arranged for simple, quick and accurate mechanical and electrical rearrangement of one electrical sub-unit of an assemblage of several sub-units relatively to the others.

With the above and other objects in view, one embodiment of the invention may present a main housing to contain a plurality of electrical sub-units assembled cooperatively into one electrical apparatus, and a secondary housing supported in the main housing to be movable from a normal orientation in which the entire electrical apparatus has one mode of operation to another normal orientation in which the apparatus has another mode of operation, one of the electrical sub-units being housed in the sub-housing and being movable therewith to effect a change of interconnection of the sub-unit in the apparatus.

Other objects and features of the invention will appear from the following detailed description of one embodiment of the invention taken in connection with the accompanying drawings in which the same reference numerals are applied to identical parts in the several figures, and in which Fig. 1 is a broken view in vertical side elevation of a housing constructed in accordance with the invention to house a dual purpose electrical apparatus;

Fig. 3 is a view similar to Fig. 1 showing the sub-housing moved out of its normal position;

Fig. 4 is a partial section on the line 4—4 of Fig. 1; and

Fig. 5 is a partial section on the line 5—5 of Fig. 1.

Figure 1:
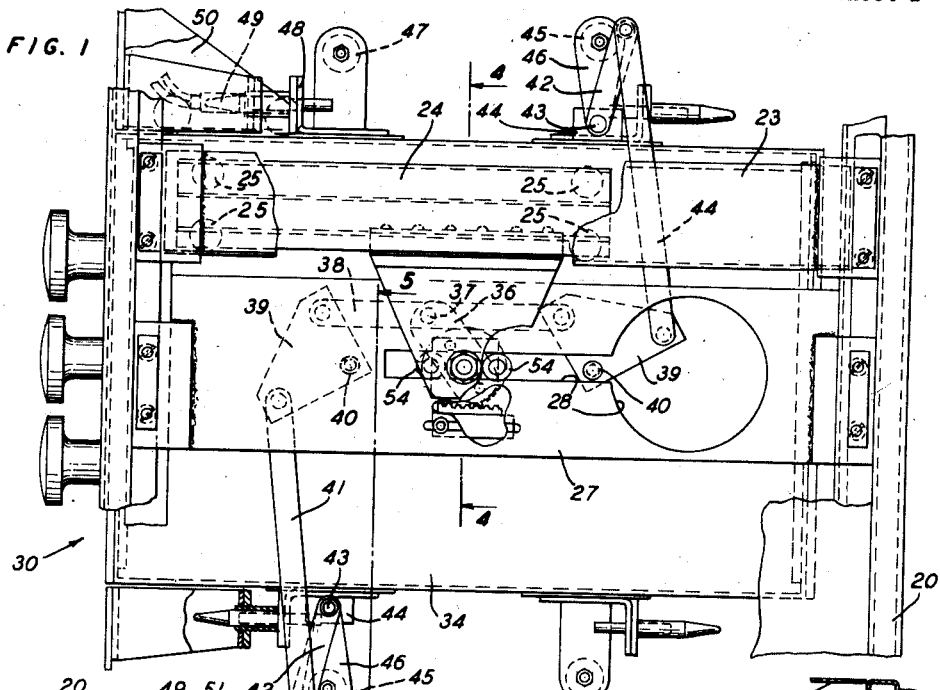

The embodiment herein disclosed is to be thought of as a housing to contain and mount a complex electrical apparatus comprising a plurality of electrical devices assembled and mounted in the housing and connected together in two or more sub-units or sub-assemblies which are interconnectible to form an electrically operative whole. The apparatus is so designed and constructed and assembled, that one of the sub-units or sub-assemblies composing it may be interconnected into the whole apparatus in either of two ways whereby the apparatus will be usefully operative in either arrangement for a function and mode of operation distinct from those in the other arrangement.

The particular nature, structure, arrangements, and modes of operation of the electrical apparatus and its several component sub-units or sub-assemblies form no part of the present invention. Hence no part of the apparatus is herein disclosed except certain typical and illustrative contact members, as hereinafter particularized. The electrical apparatus is per se of interest here only as comprising at least two sub-assemblies of which one is interconnectible electrically with the other in two different fashions. The invention is concerned with the housing of such an apparatus and the provision of means to effect the alternative interconnection of one sub-assembly of the apparatus in two distinct fashions.

The housing will be thought of as a vertical, rectangularly parallelopipedal box or cabinet constructed in any appropriate fashion, e. g. with vertical channel shaped posts 20 at the four corners. These are connected and the sides closed in by sheet members 21 forming side walls, and suitably secured to the posts. The rear wall is preferably a door 22 composed of a sheet hinged at one vertical edge to one of the rear corner posts. The front may be open, except as hereinafter described, or may be closed in by two or more suitable panels. Mounting members, crossbars, shelves, or the like (not shown) may be provided and secured to the posts or side walls as desired, to receive and support the devices of the apparatus except those forming the dually interconnectible sub-assembly.

For these a secondary housing generally indicated at 30 is provided. This may conveniently take the form of a rectangular frame, tray or box, mounted as a drawer in the main housing to be movable transversely to the main housing, i. e. horizontally in the present instance, partially out of the main housing and back into it at will. To this end a channel member is mounted horizontally and rigidly against each of the sides 21 to form a track 23 (Fig. 4). A carriage 24 provided with rollers 25 runs within and on each track and is provided with a depending rigidly attached sheet shaped flange 26. A non-rotatable shaft 31 is supported in the two flanges 26, one on each side of the main housing, to lie horizontally across and within the main housing. This shaft 31 is rigidly secured to both flanges 26 and with them forms a rigid carrier unit reciprocable horizontally on the tracks 23 within the main housing.

A stationary sheet member 27 mounted at its front and rear ends on brackets attached to the corner posts 20 extends from front to back of the main housing at each side parallel to and a short distance inside of the flange 26. These members 27 are each formed with a keyhole slot 28 through which the shaft 31 extends and within which the shaft may move freely within the travel of the carriages.

A gear 32 is journalled on the shaft 31, near each end thereof and just inside of the keyhole slotted sheets 27, to be freely rotatable on the shaft. Each of the two gears 32 is normally engaged with a short stationary rack 33 secured to the keyhole slotted member 27.

The secondary housing 30, already described as a rectangular box, tray, frame or the like within the main housing, has two side members 34, here shown as plates, parallel to the sides 21 of the main housing, and located a little inside of the gears 32. These side members 34 are journalled on the shaft 31 to be supported thereby and rotatable thereon, as by journal blocks 35 secured to the members 34, e. g. welded thereto as shown.

Two small free-running guide wheels or rollers 54 carried by stub shafts mounted on each of the members 34, run in the slot 28 and prevent the housing 30 from rotating about the shaft 31 until the housing has been horizontally moved from the position shown in Fig. 1 to that of Fig. 3, where the rollers 54 are in the enlarged portion of the slot.

A short upstanding lever 36 is pivoted on the shaft 31 and secured against the inner face of the gear 32 in any suitable fashion (not shown), and lies just outside of the member 34. A pin 37 mounted in the upper end of the lever 36 projects inwardly (through an appropriate aperture in the member 34 if necessary) and is pivotally engaged with the mid point of a horizontal link 38 positioned within and parallel to the member 34. Each end of each link 38 is pivotally connected to an upstanding arm of a bellcrank lever 39 which is pivotally supported at 40 on the member 34. The outer end of each of the levers 39 is pivotally connected to a pull rod or link 41 of which one (at the left in Fig. 1) extends substantially vertically up through the top of the secondary housing 30 and the other extends similarly down through the bottom.

The outer end of each pull rod 41 is pivotally attached to the outer end of a short lever 42 rigidly secured to one end of a transverse shaft 43. The two shafts 43 are journalled in bearings 44 mounted in the one case on the top of the housing 30 and in the other instance on the bottom. A handle 45 is parallel to each shaft and secured to and spaced from the shaft by levers 46 rigidly secured to the shaft.

Auxiliary handles 47 may also be rigidly mounted on the secondary housing 30 if desired, to assist in the manipulations.

Just above the top surface of the housing 30, a bracket or other support 50 is rigidly secured to the front of the main housing over each forward upper corner of the secondary housing 30, and a corresponding bracket 48 is mounted on the housing 30 to abut each of the brackets 50. Telescopically interfitted guide pins 49 and sockets 51 are mounted respectively on the brackets 48 and 50. Coactable electrical contact devices, here shown as plugs 52 and sockets 53, are likewise mounted respectively on the brackets 48 and 50 to be electrically connected by abutment of the brackets. Analogous guide and contact members are similarly mounted on the forward under corners of the housing 30 and on the adjacent part of the front of the main housing. On the rear under corners of the housing 30 are brackets with guide and contact members identical with those on the front upper corners, and on the rear upper corners of the housing 30 are structures identical with those on the front under corners. Thus if the housing 30 be rotated 180° about the shaft 31, the guide and contact members at the front will also correspond.

Figure 2:
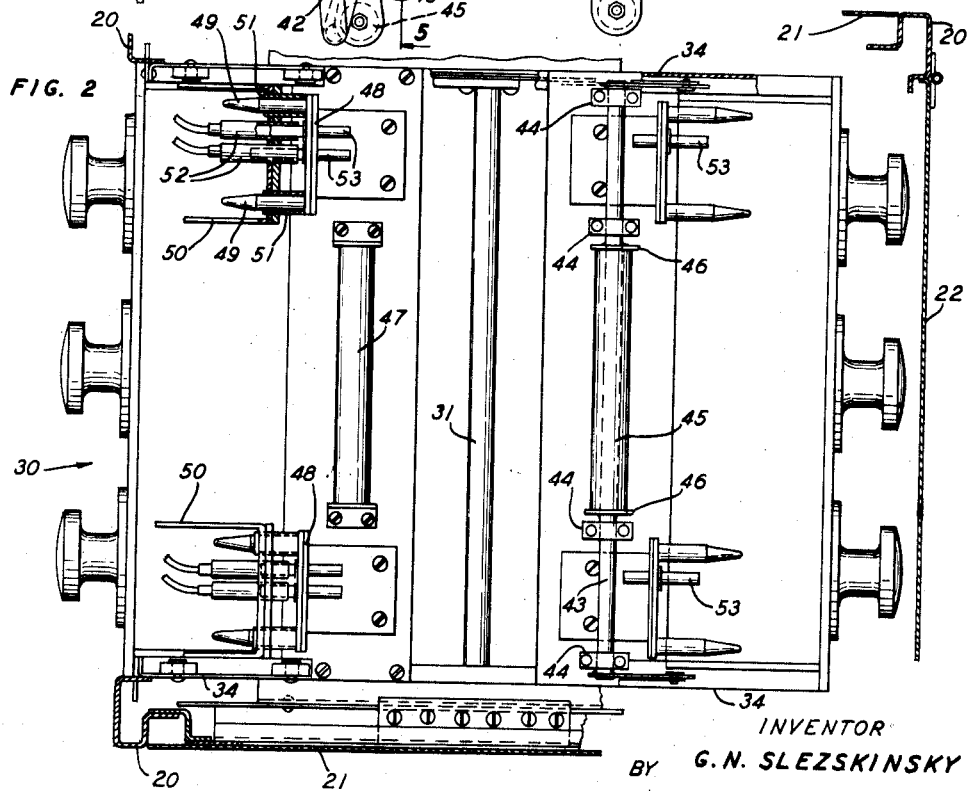
Fig. 2 is a plan view of the showing of Fig. 1.

Assume now that the state of affairs is that indicated generally in Figs. 1 and 2; that there is a principal assembly of electrical devices mounted and housed in the main housing in the portions thereof above or below or both above and below the auxiliary or secondary housing 30; and that there is an auxiliary or secondary assembly of electrical devices mounted and housed in the housing 30. Assume also that the devices are so assembled and connected to the several contact members 52 and 53, that the combination effected when the position is that of Figs. 1 and 2 has a particular useful electrical function, while the combination effected if the housing 30 be rotated 180° also has a useful but different electrical function.

To change from the one combination to the other, the door 22, if there is one, is opened. The top handle 45 is pulled rearwardly. However, this does not at first effect motion of the housing 30 because of the heavy frictional grip of the interfitted electrical contact members and of the interfitted guide members, which may require a direct pull of 50–100 lbs. to separate them.

The handle moves back, causing the linkage 46, 43, 42, 41, 39 and 38 to turn the lever 36 clockwise (Fig. 1) and therewith the gear 32. The lever takes its fulcrum where the gear engages the rack 33, thus having, with the proportions above as shown, about a three to one advantage at its load point where it turns on the shaft 31. Thus a pull of 15–40 lbs. on the handle 45 will draw the shaft 31 and therewith the housing 30 rearwardly to separate the interfitted parts. The gear 32 then leaves the rack 33, and the housing 30 is free to be drawn rearwardly until the roller pairs 54 enter the enlarged circular part of the keyhole slot 28, the housing 30 being at all times supported by the shaft 31 which is carried by the flanges 26 of the carriage 24 running on the tracks 23.

The housing 30 may then be rotated bodily and freely about the shaft 31 in the manner indicated in Fig. 3, until it has been reversed, i. e. turned through 180°. It may then be pushed horizontally forward, being guided in the first instance by the entry of the rollers 54 into the straight and narrow part of the slot 28, and then more accurately and closely by the entry of the tapered pins 49 into the sleeves 51, until the plugs 52 enter the sockets 53. As the pins begin to fit into the sleeves, the frictional resistance begins, but at this time the gear 32 engages the rack 33 and the gear and lever 36 are actuated by the handle 45 to cam the last fraction of the motion. Thus the interconnection of the two assemblies is changed by effecting a change in orientation of the auxiliary housing with respect to the main housing.

The embodiment above disclosed is illustrative and may be variously modified and departed from without departing from the spirit and scope of the invention as pointed out in and limited solely by the appended claims.

What is claimed is:

1. For use in housing an electrical arrangement comprising two individually electrically unitary assemblies of electrical devices which two assemblies are interconnectible electrically to each other in either of two distinct ways, housing means comprising a main housing to house one of the assemblies, an auxiliary housing within the main housing to house the other assembly, means to support the auxiliary housing to be movable from one orientation to another orientation with respect to the main housing, and means to interconnect the two assemblies electrically in one way in one orientation and another way in the other.

2. For use in housing an electrical arrangement comprising two individually electrically unitary assemblies of electrical devices which two assemblies are interconnectible electrically to each other in either of two distinct ways, housing means comprising a main housing to house one of the assemblies, an auxiliary housing within the main housing to house the other assembly, means to support the auxiliary housing to be reversible end for end, and means to interconnect the two assemblies electrically in one way in one orientation and another way in the other.

3. For use in housing an electrical arrangement comprising two individually electrically unitary assemblies of electrical devices which two assemblies are interconnectible electrically to each other in either of two distinct ways, housing means comprising a main housing to house one of the assemblies, a member reciprocable within the main housing from a normal position to an abnormal position, an auxiliary housing to house the other assembly and mounted on the reciprocable member to move therewith and to be rotatable thereon into either of two orientations with respect thereto, and means on the main housing and on the auxiliary housing to electrically interconnect the assemblies in one way when the member is in normal position and the auxiliary housing is in one orientation and in another way when the member is in normal position and the auxiliary housing is in the other orientation.

4. For use in housing an electrical arrangement comprising two individually electrically unitary assemblies of electrical devices which two assemblies are interconnectible electrically to each other in either of two distinct ways, housing means comprising a main housing to house one of the assemblies, a member reciprocable within the main housing from a normal position to an abnormal position, an auxiliary housing to house the other assembly and mounted on the reciprocable member to move therewith and to be rotatable thereon only when the member is in its abnormal position into either of two orientations with respect thereto, and means on the main housing and on the auxiliary housing to electrically interconnect the assemblies in one way when the member is in normal position and the auxiliary housing is in one orientation and in another way when the member is in normal position and the auxiliary housing is in the other orientation.

5. For use in housing an electrical arrangement comprising two assemblies of electrical devices interconnectible electrically in two distinct ways, housing means comprising a main housing to house one of the assemblies, a member reciprocable within the main housing from a normal position to an abnormal position, an auxiliary housing to house the other assembly and mounted on the reciprocable member to move therewith and to be rotatable thereon into either of two orientations with respect thereto, frictionally intergripping means on the main housing and on the auxiliary housing to electrically interconnect the assemblies in one way when the member is in normal position and the auxiliary housing is in one orientation and in another way when the member is in normal position and the auxiliary housing is in the other orientation, and means to cam the intergripping means apart to move the reciprocable member from its normal position.

6. For use in housing an electrical arrangement comprising two assemblies of electrical devices interconnectible electrically in two distinct ways, housing means comprising a main housing to house one of the assemblies, a track within the main housing, a carriage reciprocable on the track from a normal position to an abnormal position, a shaft on the carriage, an auxiliary housing to house the other assembly and journalled on the shaft to be rotatable thereon into either of two orientations, and electrical connecting means on the two housings to interconnect the two assemblies in one way when the carriage is in its normal position and the auxiliary housing is in one orientation and in another way when the carriage is in its normal position and the auxiliary housing is in the other orientation.

7. For use in housing an electrical arrangement comprising two assemblies of electrical devices interconnectible electrically in two distinct ways, housing means comprising a main housing to house one of the assemblies, a track within the main housing, a carriage reciprocable on the track from a normal position to an abnormal position, a shaft on the carriage, an auxiliary housing to house the other assembly and journalled on the shaft to be rotatable thereon into either of two orientations, means to prevent rotation of the auxiliary housing except when the carriage is in its abnormal position, and electrical connecting means on the two housings to interconnect the two assemblies in one way when the carriage is in its normal position and the auxiliary housing is in one orientation and in another way when the carriage is in its normal position and the auxiliary housing is in the other orientation.

8. For use in housing an electrical arrangement comprising two assemblies of electrical devices interconnectible electrically in two distinct ways, housing means comprising a main housing to house one of the assemblies, a track within the main housing, a carriage reciprocable on the track from a normal position to an abnormal position, a shaft on the carriage, an auxiliary housing to house the other assembly and journalled on the shaft to be rotatable thereon into either of two orientations, means to prevent rotation of the auxiliary housing except when the carriage is in its abnormal position, electrical connecting means on the two housings to interconnect the two assemblies in one way when the carriage is in its normal position and the auxiliary housing is in one orientation and in another way when the carriage is in its normal position and the auxiliary housing is in the other orientation, and guide means on the two housings to ensure accurate actuation of the electrical connecting means when the carriage moves from its abnormal to its normal position.

GREGORY N. SLEZSKINSKY.